Figure 1:
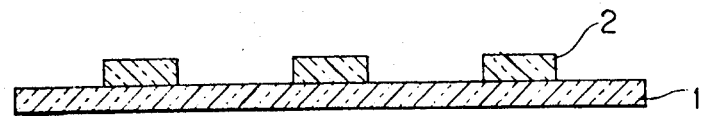

United States Patent [19]
Takeuchi et al.

[11] 3,754,913
[45] Aug. 28, 1973

[54] METHOD FOR PRODUCING A COLORED TRANSPARENT PHOTO-MASK

[75] Inventors: Satoshi Takeuchi, Kawasaki; Koniomi Tsuda, Tokyo, both of Japan

[73] Assignees: Eiichi Inoue; Canon, Kabushiki Kaisha, both of Tokyo, Japan; part interest to each

[22] Filed: May 7, 1971

[21] Appl. No.: 141,411

Related U.S. Application Data
[62] Division of Ser. No. 26,875, April 9, 1970, abandoned.

[30] Foreign Application Priority Data
July 28, 1969  Japan .............................. 44/59539

[52] U.S. Cl. ..................... 96/38.3, 96/36, 96/36.2, 117/37, 117/124
[51] Int. Cl. .............................................. G03c 5/00
[58] Field of Search ......................... 95/1; 355/125; 117/124, 37; 96/36.2, 27 R, 38.3, 36

[56] References Cited
UNITED STATES PATENTS

| | | | |
|---|---|---|---|
| 3,510,371 | 5/1970 | Frankson | 96/27 R |
| 1,328,833 | 1/1920 | Hasburg | 117/124 B |
| 3,443,915 | 5/1969 | Wood et al. | 95/1 |
| 3,508,982 | 4/1970 | Shearin | 96/27 R |
| 3,542,612 | 11/1970 | Cashau et al. | 96/38.3 |

*Primary Examiner*—Norman G. Torchin
*Assistant Examiner*—Richard L. Schilling
*Attorney*—Wenderoth, Lind & Ponack

[57] ABSTRACT

This invention relates to a colored, transparent photo-mask consisted of a transparent base plate and a colored, transparent visible image made of a colored inorganic material. Also this invention relates to a method for producing the colored, transparent photo-mask.

2 Claims, 3 Drawing Figures

1 : TRANSPARENT GLASS OR PLASTIC PLATE
2 : COLORED TRANSPARENT VISIBLE IMAGE
3 : UNDER COAT OF METAL

METHOD FOR PRODUCING A COLORED TRANSPARENT PHOTO-MASK

This application is a division of Ser. No. 26,875, filed Apr. 9, 1970, now abandoned.

DETAILED EXPLANATION OF INVENTION

This invention relates to a photo-mask having a visible image which is formed on a colored thin layer of a colored inorganic material which is coated on a transparent base plate and particularly this invention relates to a colored, transparent photo-mask having a colored, transparent visible image formed on a colored thin layer of a colored inorganic material which is coated on a transparent base plate so as to transmit a part of the visible light and to absorb a light having a wavelength for sensitizing a photosensitive material to an intensity not sensitizing said photosensitive material when it is exposed to said visible light. The meaning of the term "photo-mask" used herein indicates the so-called original plate consisting of a transparent base plate such as a glass plate or a plastic plate on which an original pattern is formed. Such a photo-mask is used when a photosensitive layer coated on a suitable base plate is optically exposed to form a photo-resist image.

Heretofore, such a photo-mask was manufactured by using a photo dry-plate or a photo film on which a silver image is formed by photography using a silver salt. Such a dry-plate or film is cheap and can be easily and simply produced but it can not avoid a defect that the strength of the silver image is dropped due to the weakness of the gelatine layer in which the silver image is imbedded. In order to increase the strength of such a photo-mask, there was proposed a metal-on-glass mask having a metallic image on a glass plate. Such a metal-on-glass mask is manufactured by a method comprising the steps of vacuum evaporating a metal on a base plate to form a thin metallic layer, coating a photosensitive material onto the thin metallic layer, coating a photosensitive image on said photosensitive material, developing the latent image to form a photo-resist image and then removing the part of the metal layer on which the photo-resist image is not developed by using the etching technique to produce a visible metallic image. The metal used for the vacuum-evaporation or sputtering includes Cr, Ni, Ag, Cu and the like but the preferred metal is chromium as it has high strength and good adhesiveness onto the surface of the glass plate. The metal-on-glass mask has higher strength and longer life in use as compared with the photo-mask which is manufactured by using the photo dry-plate or the photo film.

Recently, the photo-etching technique has been developed and the photo-mask has been used for producing various kinds of industrial parts or accessories which are required for high accuracy, and particularly electronic parts such as a transistor and an integrated circuit which are required for ultra-high accuracy. In the photo-etching such a photo-mask is required to be strong as an essential characteristic because it must be repeatedly used as the original plate. From this point of view, the metal-on-glass mask is the most preferable. When the photo-mask is used for manufacturing the electronic parts such as a transistor and an integrated circuit, such a photo-mask should be so placed on a silicon plate, on which a silicon relief image is previously formed and also a photo-resist is coated, so that the visible image of the photo-mask is located on said silicon relief image at the designed position by carefully carrying out a registering technique. The photo-masks as mentioned above have the opaque image disposed on the base plate and therefore it is impossible to see the silicon relief image previously formed in the surface area of the silicon plate because the image is hidden behind the opaque image, causing difficulty to the registering technique. When the photo-mask has a transparent image which is visible to the naked eye, it is possible to see the silicon relief image previously formed in the surface area of silicon plate and therefore the registering technique can easily be carried out with accuracy. This fact is illustrated on page 17 and so on in the book entitled as "Proceedings of the 2nd Kodak Seminar on Microminiaturization", Apr. 4 and 5, 1966 but the book does not explain the method for producing a photo-mask having a colored, transparent image. It is considered that the photo-resist image can be colored with a dyestuff or the silver image can be converted to a colored image by the conventional dye coupling development. Such a colored silver image is the same as the silver image in accuracy and strength. In addition, there is no dyestuff for permitting a deep color to the photo-resist image and so a light having a wavelength for sensitizing a photo-sensitive material is incompletely shut off to produce a fog. When the photo-resist contains a large amount of impurities, the photo-resist image is reduced in resolving power and strength even if the deep colored image is obtained, and therefore, the deep colored photo-resist image is degraded as compared with the conventional silver image. Also, it is considered that certain diazo compounds and a photo-chromic material can be used for producing a deep colored image but such a colored image is defective in its strength.

An object of this invention is to provide a colored, transparent photo-mask having no defect inherent in prior photo-masks.

Another object of this invention is to provide a colored, transparent photo-mask satisfying the three functional characteristics, the high resolving power, durability and ease of registration.

The abovementioned objects can be achieved in accordance with this invention by providing the colored, transparent photo-mask which is produced by the steps of vacuum evaporating, sputtering or coating a colored, transparent material on a transparent, hard base plate such as a glass plate to form a colored thin layer, and preferably a colored thin layer having a thickness of below $1\mu$ so as to allow an optical density of above 1.5 in the area of wavelength of the light to be absorbed, coating a suitable photosensitive material on said colored thin layer, optically exposing said photosensitive material to an interest to form a latent image, developing said latent image to form a photo-resist image and then removing the part of said colored thin layer on which said photo-resist image is not formed by using the etching technique to produce a colored visible image on said transparent base plate. Also the colored thin layer can be formed in the surface area of the glass plate by using the staining techniques for diffusing certain materials.

Figure 2:
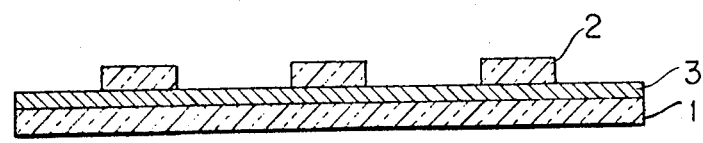
Figure 3:
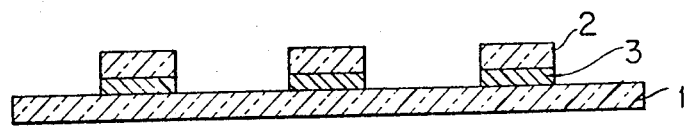

In the drawings, FIGS. 1–3 represent photo-masks prepared in accordance with this invention. The various components of the photo-masks are identified as indicated on the drawings.

It is preferable to use a vitreous material for producing the colored thin layer but the conventional glass, in general, is difficult to vapor evaporate. Therefore, it is preferable to use a so-called chalcogen glass which is produced by melting a mixture of As, S and Se or other metallic elements. The colored thin layer consisting of As an S is yellow and can absorb the light below about 500 m $\mu$ in wavelength. Such a colored thin layer might be used as a mask for the conventional photo-resists sensitized in the wavelength range of 250 to 550 m $\mu$ but it can not practically be used as it is yellowish and visually indistinguishable. When a colored thin layer is made of a mixture of As, S and Se, its color changes from orange to red as the amount of Se contained in the mixture increases. It is practically preferred to use the orange colored or the red colored thin layer of the chalcogen glass. The strength of such a chalcogen glass can be increased by an addition of Se and/or Ge, and therefore the As - S - Ge type and the As- Se - Ge type of the chalcogen glass have high strength.

Such a chalcogen glass, however, has a significant defect that it has a high thermal expansion coefficient of a $10^{-6}$ or more level in comparison with the conventional glass having a thermal expansion coefficient of a $10^{-7}$ level and therefore it is very often difficult to obtain firm adhesion of the chalcogen glass to the conventional glass plate.

It was found that the defect in such a chalcogen glass can be improved by using an undercoating material in the state of a thin layer disposed between the conventional glass plate and the chalcogen glass because the undercoating thin layer is firmly adhered to each of them. If the undercoating material is opaque, the undercoating layer should be thin enough to maintain its transparency and it was found that such a thin layer can be used satisfactorily.

The undercoating thin layer can be made of a material selected from the group consisting of metals of Groups III A, IV A and VI A of the Periodic Table, their oxides and magnesium fluoride. Also, it should be understood that the undercoating thin layer can be omitted when the germanium-containing chalcogen glass is vapor evaporated or sputtered directly on a glass plate having a relatively high thermal expansion coefficient.

In accordance with this invention, the chalcogen glass can be replaced with a colored inorganic compound such as cadmium sulfide (red), zinc sulfide (yellow), cadmium selenide (red), chrome red, molybdenum red, antimon red, mercury-cadmium sulfide, cadmium chromate or mixtures thereof for producing a colored thin layer varying in color from yellow or orange to red in the same manner as in the chalcogen glass.

Also, the abovementioned techniques for the preparation of the colored thin layer can be replaced with the staining technique by which the glass surface is colored with a metal such as copper, silver or the like. For example, the glass surface is coated with a paste comprising a copper salt and clay or the like, the coated glass is heated to permeate copper ions into the glass surface, the paste is removed from the heated glass and then the copper ions-permeated glass is heated in the presence of a reducing atmosphere to produce a copper stain on the glass surface. In such a case, the paste may contain a reducing agent for simplifying the staining technique. This is fully explained in the "Handbook for Glass Engineering", pages 588 to 599 and page 750 by Taro Moriya et al, published by the Asakura Books Co. The colored layer thus produced is pale in color as compared with the color of the chalcogen glass layer but a light-intercepting layer can be achieved by forming the colored layer as thin as $0.5\mu$ to $1\mu$ in thickness in the surface area of the glass plate.

Still further, it was found that the glass plate can be colored with a soldering glass comprising cadmium selenide (red) and cadmium or selenium by coating the glass plate with the soldering glass and then heating the soldering glass at a temperature of 300°C to 700°C.

In accordance with this invention, the photo-resist image is formed in the same manner as in the conventional procedures on the colored thin layer disposed on the conventional glass plate or plastic plate. Then, a part of the colored thin layer on which the photo-resist image is not formed is removed from the glass plate by etching that part of the colored thin layer with an alkali etching agent such as sodium hydroxide, potassium hydroxide, ammonium hydroxide or the like or an acid etching agent such as hydrofluoric acid to retain the colored, transparent image on the glass plate. When a positive working photo-resist such as a so-called AZ-III sold by Skipley Company and the colored thin layer made of the As - S - Se type of the chalcogen glass are applied on the glass plate, a colored, transparent image is produced by developing a latent image and simultaneously removing a part of the colored thin layer on which the latent image is not formed. When the glass plate is coated with the colored inorganic compounds or the soldering glass or stained by the staining technique, a high strength colored photo-mask can be produced by removing that part of the colored layer on which a photo-resist image is not formed from the glass plate by etching that part of the colored layer with an etching solution containing hydrofluoric acid.

This invention is illustrated by the following Examples.

EXAMPLE 1

Two parts by weight of arsenic, 0.5 to 1 part by weight of sulfur and 2 to 2.5 parts by weight of selenium were weighed into a pyrex glass tube in the presence of a nitrogen gas and pyrex glass tube was evacuated and sealed at ends by heating it. The pyrex glass tube was placed in an electric furnace and heated at about 650°C for 5 hours to produce a chalcogen glass and the pyrex glass tube was cooled and a suitable amount of the chalcogen glass was transferred to a boat as an evaporating source.

A glass plate was degreased and washed with a mixture of potassium bichromate and concentrated sulfuric acid, and then washed with water and dried. The clean glass plate was coated with a thin layer of chromium by vacuum evaporating chromium under the reduced pressure of about $10^{-6}$ Torr while the glass plate was maintained at a temperature of 50° to 200°C and the chromium source was maintained at a temperature of 1300 to 1400°C.

The chromate glass plate was then coated with a chalcogen glass layer having thickness of 1000 to 10,000A. by vacuum-evaporating the chalcogen glass under the reduced pressure of about $10^{-6}$ Torr while the chromated glass plate was maintained at a temperature of from room temperature to 150°C and the evaporating source in the boat was maintained at a temperature of 400° to 500°C.

It was found that the glass plate is coated with an orange colored, transparent layer and also that such a colored plate absorbs a light having a wavelength of below 550 mµ. The colored plate was coated with a mixture of Novolak type phenol resin and quinondiazide (AZ-III photo-resist sold by Shipley Company) by spincoating it at a speed of 4,000 to 9,000 r.p.m. onto said colored plate. A high sensitive dry plate on which an image of an integrated circuit was formed was tightly placed on the photo-resist and exposed to light and then developed with the designated developer. When the photo-resist which exists in the exposed area and the chalcogen glass layer which is retained under the exposed area were removed, a photo-mask, on which an orange colored image of the integrated circuit was formed, was produced. The photo-mask can be printed on a photo-resist consisting of a cinnamic acid ester of polyvinyl alcohol (a photo-resist sold by Kodak Company) with satisfactory results. The photo-mask was tested for adhesive strength between the colored layer and the glass plate by adhering Scotch tape on the colored layer and then rapidly stripping the Scotch tape from the colored layer. As the results, it was found that there is no pin hole on the photo-mask.

EXAMPLE 2

A so-called cadmium red was manufactured by using a mixture of 70 to 75 parts by weight of cadmium, 5 to 10 parts by weight of selenium and the balance of sulfur.

A glass plate was coated with a thin layer of aluminum by using the vacuum-evaporating procedure.

The aluminated glass plate and a clean glass plate were respectively coated with cadmium red to have a colored layer having a thickness of 500 to 8000A by vacuum-evaporating the cadmium red under the reduced pressure of $10^{-6}$ Torr while the aluminated glass plate and the clean glass plate were maintained at a temperature of 70° to 150°C and the evaporating source of the cadmium red was heated to a suitable temperature sufficient for evaporating it. Each of the colored transparent plates was coated with a photo-resist consisting of partially cyclized cis-polyisoprene (Kodak thin film resist) and a red colored image was formed on the resist by using the conventional procedures. Then the colored plate was subjected to the etching procedure by using a mixture of hydrofluoric acid and hydrochloric acid to produce a photo-mask. The photo-mask was tested for adhesive strength in the same manner as in Example 1 and it was found that the photo-mask which was manufactured by using the aluminated glass plate is better than the photo-mask which was manufactured by using the clean glass plate and also that both photo-masks can be practically used.

EXAMPLE 3

A potassium glass plate was coated with a clay containing a copper oxide and the clay coated glass plate was heated at a temperature of 400° to 600°C and then the clay was removed from the glass plate. Then, the glass plate was heated in the presence of a hydrogen stream for reducing cupric ions to produce a layer of a so-called copper-stain on the surface of the glass plate. It was found that the layer is red and transparent, and a 1µ thickness or less.

The colored glass plate was coated with the Kodak thin film resist and then a red colored image was formed on the resist by using the conventional procedures. Then the colored glass plate was subjected to the etching procedure by using hydrofluoric acid to produce a photo-mask. The photo-mask can be printed on many other kinds of photo-resists with satisfactory results. Also, the photo-mask can be printed on the Kodak high resolution dry plate. The photo-mask was tested for adhesive strength and it was found that the adhesive strength is greater than those of the photo-masks as explained in Examples 1 and 2.

What we claim is that:

1. A method for producing a colored, transparent photo-mask which comprises forming a colored thin layer of chalcogen glass on a transparent glass plate or an under-coated glass plate by vapor evaporating or sputtering the chalcogen glass, coating a photosensitive material on the colored thin layer, forming a latent image on the photosensitive material, developing the latent image to produce an image of the photo-sensitive material on the colored thin layer, removing the portion of the colored thin layer on which the image is not formed by etching said portion with an etching agent, thereby resulting in a colored, transparent photo-mask having a photo resist thereon, and removing the photo resist from the colored thin layer.

2. The method according to claim 1, wherein the transparent glass plate is under-coated with a thin layer of a member selected from the group consisting of chromium and aluminum by vapor evaporating or sputtering the chromium or aluminum on the transparent glass plate.

* * * * *

UNITED STATES PATENT OFFICE
CERTIFICATE OF CORRECTION

Patent No. 3,754,913          Dated August 28, 1973

Inventor(s) Satoshi Takeuchi et al.

It is certified that error appears in the above-identified patent and that said Letters Patent are hereby corrected as shown below:

Correct the Heading of the Patent to read:

--assignors to Eiichi Inoue, Canon Kabushiki Kaisha and Dai Nippon Insatsu Kabushiki Kaisha, all of Tokyo, Japan, a one-third undivided joint interest to each--.

Signed and sealed this 2nd day of April 1974.

(SEAL)
Attest:

EDWARD M. FLETCHER, JR.
Attesting Officer

C. MARSHALL DANN
Commissioner of Patents